May 21, 1929.  J. ZANG  1,713,940
CUTTING AND FLANGING TOOL
Filed Feb. 18, 1928  2 Sheets-Sheet 1
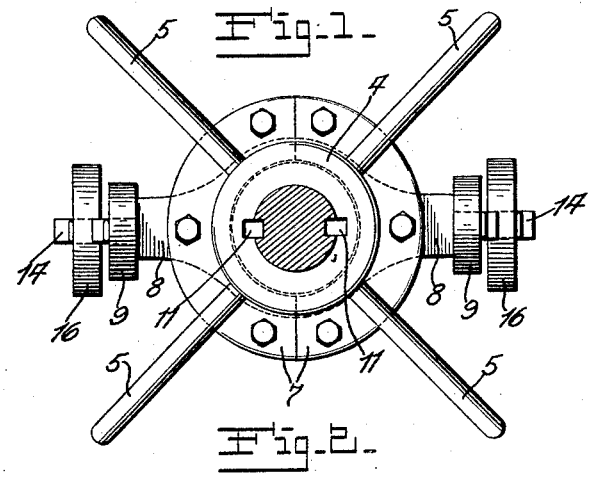
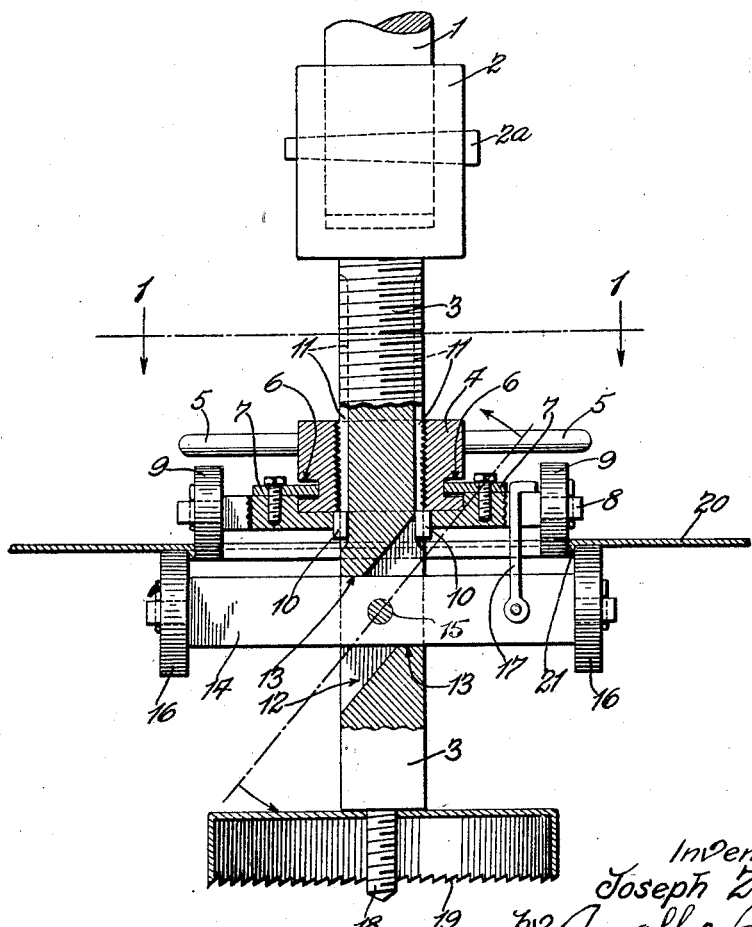
Inventor:
Joseph Zang,
by Small & Small
His Attorneys.

May 21, 1929.  J. ZANG  1,713,940
CUTTING AND FLANGING TOOL
Filed Feb. 18, 1928   2 Sheets-Sheet 2
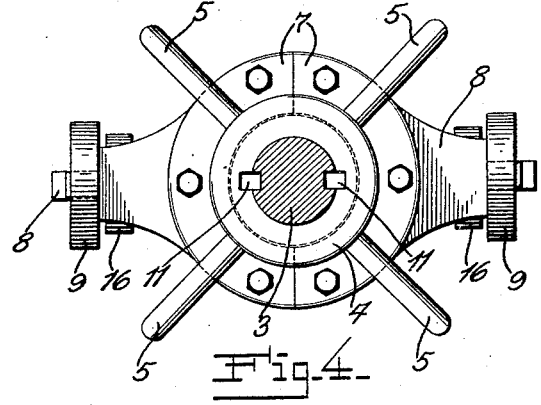
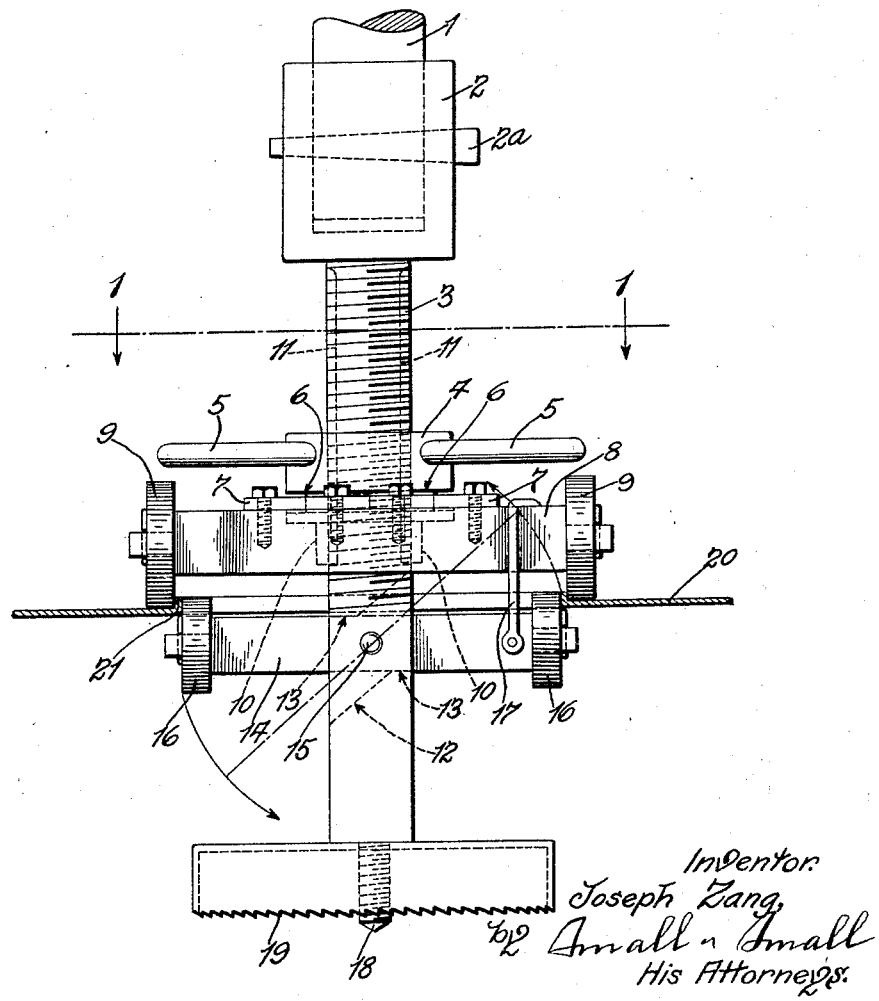
Inventor:
Joseph Zang,
by Small n Small
His Attorneys.

Patented May 21, 1929.

1,713,940

UNITED STATES PATENT OFFICE.

JOSEPH ZANG, OF ST. LOUIS, MISSOURI.

CUTTING AND FLANGING TOOL.

Application filed February 18, 1928. Serial No. 255,292.

This invention has for its prime object the provision of a novel and efficient tool for cutting a circular aperture in the head of metal drums, such as those used for the shipment of heavy grease or oil, and flanging the edge of such aperture so that a cap may be fitted securely therein, to the end that the interior of the receptacle may be thoroughly cleansed and rendered usable for the shipment or storage of all manner of liquids, solids or semi-solids.

Referring to the said drawing, wherein like numerals refer to like parts throughout the several views, Figure 1 is a top plan view of the tool of my invention; Figure 2 a sectional elevation; Figure 3 an additional top plan view of the tool; and Figure 4 an additional view in elevation differing from Figure 2 in that the parts are shown in full and the position of two elements are changed to illustrate the manner of turning the flange of the drum downward rather than upward.

The operation of the tool is, preferably, effected by connection with a drill-press and in Figures 2 and 4 the revolvable shaft of the press is indicated by numeral 1. The lower portion of said shaft projects within a socket or chuck 2 which is apertured for the passage of a coupling pin 2ª and surmounts a spindle 3 projecting through an annular block 4 and threaded for engagement with the threaded bore of said block. The latter may be raised or lowered manually upon said spindle (for the purpose of adjustment of the parts relative to the head of the drum) by turning to right or left the radial spokes or handles 5, and is provided with a circumferential slot 6 for the insertion of a two-part collar 7 which is of less thickness than the width of said slot (so as not to bind the block) and is fastened by screws to an axle 8 carrying rollers 9. Said axle is apertured for the passage of spindle 3 and rotates in unison therewith (when the drill-press is running) by reason of the insertion of keys 10 in key-ways 11 extending lengthwise of the spindle as shown in Figure 2.

At a point beneath the location of axle 8 spindle 3 is provided with a substantially angular recess 12 having shoulders 13 affording stops for retaining in true horizontal position a second axle 14 which is pivotally secured at 15 within said recess and carries a second pair of rollers 16. A lever 17 pivotally secured to axle 14 affords a convenient means for moving the axle upon its pivot while the tool is being positioned relative to the drum as hereinafter mentioned and, when the parts are in operative position as shown in Figure 2, may be latched over upper axle 8.

The lower extremity of spindle 3 is provided with a drill 18 for centering the incision in the head of the drum which is made by the toothed cutter 19.

In operation, the drill 18 first perforates the head of the drum 20 at its center and thereupon the cutter 19 makes contact with the head and forms an aperture sufficiently large to permit of the thorough cleansing of the interior of the receptacle. Next, axle 14 is tilted within the limits of recess 12 (as indicated by the dotted lines and arrows) and thus projected diagonally through said aperture, whereupon it is brought to horizontal position as shown in Figure 2 by lifting upon lever 17. In such position the rollers carried by axle 14 are brought to bear upon the inner surface of the drum adjacent the edge of the aperture formed by said cutter and by manual rotation of block 4 the rollers carried by axle 8 are then forced downward upon the rim of said aperture. The drill-press then being started and further pressure being at once exerted upon axle 8 by turning spokes 5, the rollers 9 depress said rim and, traversing a circle in unison with the rollers of axle 14, form in conjunction with the latter a flange 21 affording a seat for the frictional engagement of a complementary cap or closure (not shown).

If and when it is desired to provide an upturned flange the two axles are simply transposed, as shown in Figure 4, so that the longer axle is uppermost and the rollers of the shorter axle serve to press outward the rim of the aperture formed by cutter 19.

What I claim as new and desire to secure by Letters Patent is:—

A tool of the character described comprising means for cutting an aperture in the head of a metallic drum or barrel, an axle carrying rollers adapted to engage the interior surface of said head adjacent the edge of said aperture, a second axle carrying rollers adapted to engage the exterior surface of said head in proximity to the position of the first-mentioned rollers, means for drawing one of said axles toward the other to grip the rim of said aperture between said rollers, and means for rotating said axles in unison to flange said rim.

JOSEPH ZANG.